(12) United States Patent
Hua et al.

(10) Patent No.: US 12,135,881 B2
(45) Date of Patent: Nov. 5, 2024

(54) DISK ARRAY LOAD BALANCING VIA INTERCHANGEABLE SPARE AND DATA ALLOCATION

(71) Applicant: Dell Products L.P., Hopkinton, MA (US)

(72) Inventors: Kuolin Hua, Natick, MA (US); Kunxiu Gao, Boxborough, MA (US); Malak Alshawabkeh, Franklin, MA (US)

(73) Assignee: Dell Products L.P., Hopkinton, MA (US)

( * ) Notice: Subject to any disclaimer, the term of this patent is extended or adjusted under 35 U.S.C. 154(b) by 87 days.

(21) Appl. No.: 18/067,855

(22) Filed: Dec. 19, 2022

(65) Prior Publication Data

US 2024/0201862 A1    Jun. 20, 2024

(51) Int. Cl.
*G06F 3/00* (2006.01)
*G06F 3/06* (2006.01)

(52) U.S. Cl.
CPC .......... *G06F 3/0614* (2013.01); *G06F 3/0629* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 11,507,287 B1 * | 11/2022 | Hua | G06F 3/0631 |
| 2023/0052811 A1 * | 2/2023 | Hua | G06F 11/1425 |
| 2024/0028212 A1 * | 1/2024 | Hua | G06F 3/0689 |

* cited by examiner

*Primary Examiner* — Midys Rojas
(74) *Attorney, Agent, or Firm* — Anderson Gorecki LLP

(57) ABSTRACT

The disk drives of an array are organized into clusters of multiples of G+1 drives with G same-size indexed subdivisions, where G is the number of members in a protection group. G+1 groupings are created in each cluster, including G groupings distributed over G drives in single subdivision indices and one grouping distributed diagonally over multiple subdivision indices. A single grouping in at least one cluster is configured as spare capacity. Protection groups are located in the other groupings. Drive IO loading is rebalanced by swapping the location of a selected protection group with the location of the spare grouping. The protection group to be relocated may be selected by using LOF scores to identify a cluster with IO loading outlier drives that are overloaded and then calculating IO loading that would result from swapping locations of each protection group in that cluster with the spare grouping.

20 Claims, 7 Drawing Sheets

Drive Cluster/Matrix 400

| Drive | 1 | 2 | 3 | 4 | 5 | 6 | 7 | 8 | 9 |
|---|---|---|---|---|---|---|---|---|---|
| | 1 | 1 | 1 | 1 | 1 | 1 | 1 | 1 | 2 |
| | 3 | 3 | 3 | 3 | 3 | 3 | 3 | 2 | 3 |
| | 1 | 1 | 1 | 1 | 1 | 1 | 2 | 1 | 1 |
| | 7 | 7 | 7 | 7 | 7 | 2 | 7 | 7 | 7 |
| | 5 | 5 | 5 | 5 | 2 | 5 | 5 | 5 | 5 |
| | 9 | 9 | 9 | 2 | 9 | 9 | 9 | 9 | 9 |
| | 1 | 1 | 2 | 1 | 1 | 1 | 1 | 1 | 1 |
| | 4 | 2 | 4 | 4 | 4 | 4 | 4 | 4 | 4 |
| load | 31 | 31 | 32 | 24 | 26 | 26 | 32 | 30 | 32 |

Drive Cluster/Matrix 402

| Drive | 10 | 11 | 12 | 13 | 14 | 15 | 16 | 17 | 18 |
|---|---|---|---|---|---|---|---|---|---|
| | 2 | 2 | 2 | 2 | 2 | 2 | 2 | 2 | 0 |
| | 2 | 2 | 2 | 2 | 2 | 2 | 2 | 0 | 2 |
| | 2 | 2 | 2 | 2 | 2 | 2 | 0 | 2 | 2 |
| | 2 | 2 | 2 | 2 | 2 | 0 | 2 | 2 | 2 |
| | 4 | 4 | 4 | 4 | 0 | 4 | 4 | 4 | 4 |
| | 6 | 6 | 6 | 0 | 6 | 6 | 6 | 6 | 6 |
| | 2 | 2 | 0 | 2 | 2 | 2 | 2 | 2 | 2 |
| | 2 | 0 | 2 | 2 | 2 | 2 | 2 | 2 | 2 |
| load | 22 | 20 | 20 | 16 | 18 | 20 | 20 | 20 | 20 |

Figure 6A

Drive Cluster/Matrix 400

| Drive | 1 | 2 | 3 | 4 | 5 | 6 | 7 | 8 | 9 |
|---|---|---|---|---|---|---|---|---|---|
| | 1 | 1 | 1 | 1 | 1 | 1 | 1 | 1 | 2 |
| | 3 | 3 | 3 | 3 | 3 | 3 | 3 | 2 | 3 |
| | 1 | 1 | 1 | 1 | 1 | 1 | 2 | 1 | 1 |
| | 7 | 7 | 7 | 7 | 7 | 2 | 7 | 7 | 7 |
| | 5 | 5 | 5 | 2 | 5 | 5 | 5 | 5 | 5 |
| | 9 | 9 | 2 | 9 | 9 | 9 | 9 | 9 | 9 |
| | 1 | 1 | 1 | 1 | 1 | 1 | 1 | 1 | 1 |
| | 4 | 2 | 4 | 4 | 4 | 4 | 4 | 4 | 4 |
| load | 31 | 31 | 32 | 24 | 26 | 26 | 32 | 30 | 32 |

Drive Cluster/Matrix 402

| Drive | 10 | 11 | 12 | 13 | 14 | 15 | 16 | 17 | 18 |
|---|---|---|---|---|---|---|---|---|---|
| | 2 | 2 | 2 | 2 | 2 | 2 | 2 | 2 | 0 |
| | 2 | 2 | 2 | 2 | 2 | 2 | 2 | 0 | 2 |
| | 2 | 2 | 2 | 2 | 2 | 2 | 0 | 2 | 2 |
| | 4 | 4 | 4 | 4 | 4 | 0 | 4 | 4 | 4 |
| | 6 | 6 | 6 | 6 | 0 | 6 | 6 | 6 | 6 |
| | 2 | 2 | 2 | 0 | 2 | 2 | 2 | 2 | 2 |
| | 2 | 0 | 2 | 2 | 2 | 2 | 2 | 2 | 2 |
| | 2 | 2 | 0 | 2 | 2 | 2 | 2 | 2 | 2 |
| load | 22 | 20 | 20 | 20 | 18 | 16 | 20 | 20 | 20 |

Figure 6B

Drive Cluster/Matrix 400

| Drive | 1 | 2 | 3 | 4 | 5 | 6 | 7 | 8 | 9 |
|---|---|---|---|---|---|---|---|---|---|
| | 1 | 1 | 1 | 1 | 1 | 1 | 1 | 1 | 2 |
| | 3 | 3 | 3 | 3 | 3 | 3 | 3 | 2 | 3 |
| | 1 | 1 | 1 | 1 | 1 | 1 | 2 | 1 | 1 |
| | 7 | 7 | 7 | 7 | 7 | 2 | 7 | 7 | 7 |
| | 0 | 0 | 0 | 0 | 2 | 0 | 0 | 0 | 0 |
| | 9 | 9 | 2 | 9 | 9 | 9 | 9 | 9 | 9 |
| | 1 | 1 | 1 | 1 | 1 | 1 | 1 | 1 | 1 |
| | 4 | 2 | 4 | 4 | 4 | 4 | 4 | 4 | 4 |
| load | 26 | 26 | 27 | 19 | 26 | 21 | 27 | 25 | 27 |

Drive Cluster/Matrix 402

| Drive | 10 | 11 | 12 | 13 | 14 | 15 | 16 | 17 | 18 |
|---|---|---|---|---|---|---|---|---|---|
| | 2 | 2 | 2 | 2 | 2 | 2 | 2 | 2 | 5 |
| | 2 | 2 | 2 | 2 | 2 | 2 | 2 | 5 | 2 |
| | 2 | 2 | 2 | 2 | 2 | 2 | 5 | 2 | 2 |
| | 4 | 4 | 4 | 4 | 4 | 5 | 4 | 4 | 4 |
| | 6 | 6 | 6 | 6 | 5 | 6 | 6 | 6 | 6 |
| | 2 | 2 | 2 | 5 | 2 | 2 | 2 | 2 | 2 |
| | 2 | 5 | 2 | 2 | 2 | 2 | 2 | 2 | 2 |
| | 2 | 2 | 5 | 2 | 2 | 2 | 2 | 2 | 2 |
| load | 22 | 25 | 25 | 21 | 23 | 25 | 25 | 25 | 25 |

DISK ARRAY LOAD BALANCING VIA INTERCHANGEABLE SPARE AND DATA ALLOCATION

TECHNICAL FIELD

The subject matter of this disclosure is generally related to electronic data storage systems.

BACKGROUND

Institutional electronic data storage systems include arrays of disk drives and one or more computers that manage access to the disks. Storage system performance in terms of input-output operation per second (IOPS) is in part a function of disk access latency, which is in part a function of IO loading, so storage system performance can be degraded by imbalanced disk IO loading. It is known to heuristically redistribute data segments between disks to improve IO load balance. Per-disk IO performance statistics are collected and analyzed to detect imbalances, and then finer granularity statistics are used to select data segments and storage location destinations. However, significant processing and memory resources may be required to collect, store, and analyze the statistics and potential solutions.

SUMMARY

In accordance with some aspects, an apparatus comprises a plurality of non-volatile drives on which protection groups of a selected type are implemented, each protection group having G members; at least one compute node configured to manage access of the non-volatile drives, the at least one compute node comprising at least one processor and non-transitory computer-readable memory; and a load balancing controller configured to: organize the drives into clusters of multiples of G+1 drives with G same-size indexed subdivisions; in each of the clusters, create G+1 groupings, including G groupings distributed over G drives in single subdivision indices and one grouping distributed diagonally over multiple subdivision indices; reserve a single grouping in at least one of the clusters as a spare grouping of spare capacity; and locate ones of the protection groups in ones of the groupings that are not the spare grouping.

In accordance with some aspects, a method comprises: organizing drives of a drive array into clusters of multiples of G+1 drives with G same-size indexed subdivisions; in each of the clusters, creating G+1 groupings, including distributing G groupings distributed over G drives in single subdivision indices and distributing one grouping diagonally over multiple subdivision indices; reserving a single grouping in at least one of the clusters as a spare grouping of spare capacity; and locating ones of the protection groups in ones of the groupings that are not the spare grouping.

In accordance with some aspects, a non-transitory computer-readable storage medium stores instructions that when executed by a computer perform a method comprising: organizing drives of a drive array into clusters of multiples of G+1 drives with G same-size indexed subdivisions; in each of the clusters, creating G+1 groupings, including distributing G groupings distributed over G drives in single subdivision indices and distributing one grouping diagonally over multiple subdivision indices; reserving a single grouping in at least one of the clusters as a spare grouping of spare capacity; and locating ones of the protection groups in ones of the groupings that are not the spare grouping.

All examples, aspects, implementations, and features mentioned in this disclosure can be combined in any technically possible way. Other aspects, features, and implementations may become apparent in view of the detailed description and figures.

BRIEF DESCRIPTION OF THE FIGURES

FIG. 3A illustrates distribution of subdivision groupings on the managed drives.

FIG. 3B illustrates use of spare subdivisions to recover from a drive failure.

FIG. 5 illustrates per-member and per-drive loading.

FIG. 6A illustrates selection of a protection group for migration to spares in a different cluster.

FIG. 6B illustrates swapping of the selected protection group with the spares and rebalanced loading.

DETAILED DESCRIPTION

Figure 1:
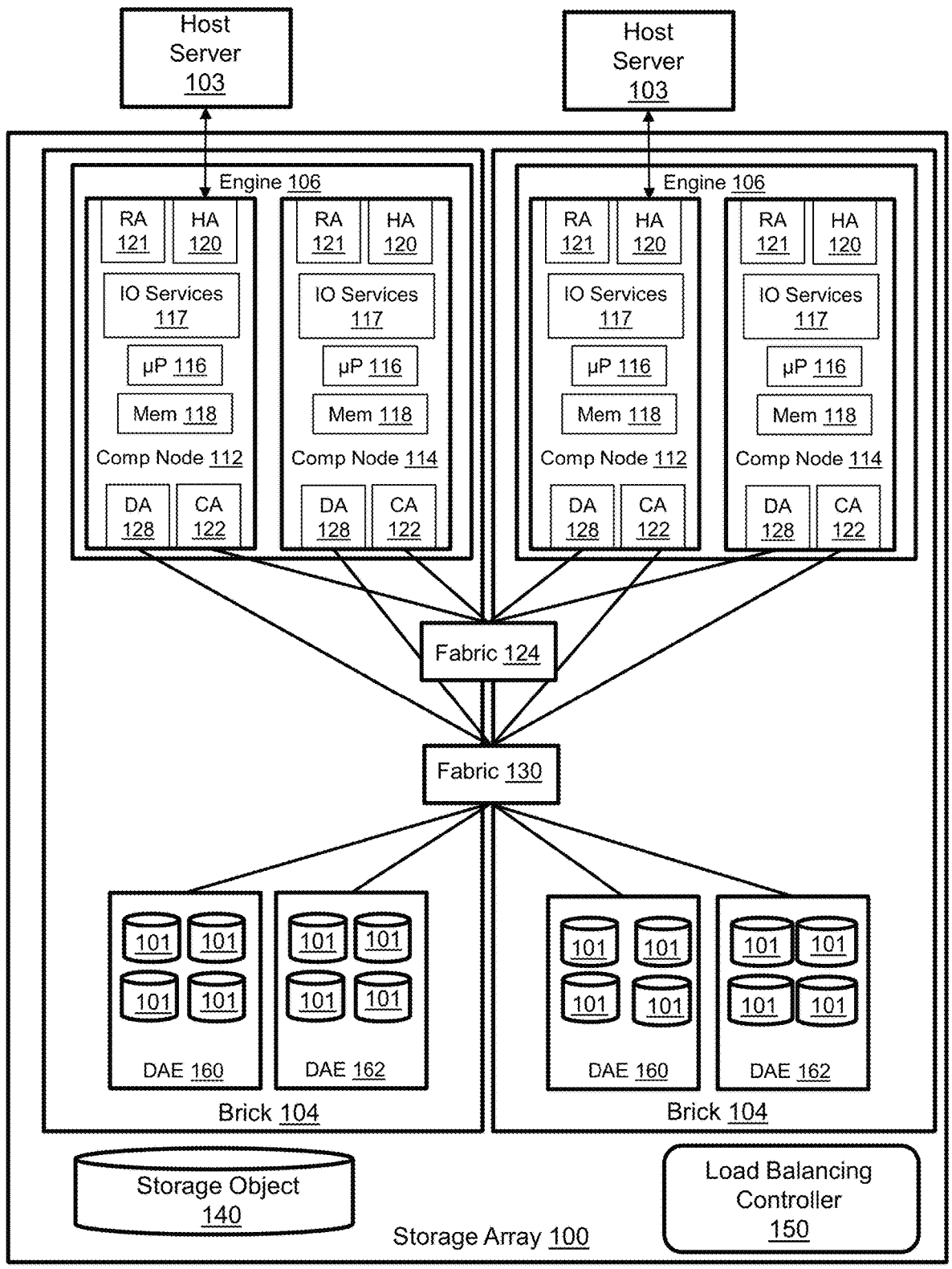
FIG. 1 illustrates a storage array with a load balancing controller that deterministically relocates protection groups to efficiently rebalance drive loading.

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Institutional data storage systems use reserved spare storage capacity and Erasure Coding (EC) or Redundant Array of Independent Disks (RAID) protection groups to maintain data availability and avoid data loss. Data and parity information associated with a protection group are distributed across multiple disks. If one of the disks fails, the protection group member on the failed disk can be reconstructed in the reserved spare storage space using the protection group members stored on the other disks. A RAID (D+P) protection group, for example, has D data members and P parity members. The data members store data. The parity members store non-data parity information such as XORs of the data values on the data members. An inaccessible data member can be rebuilt from the accessible data members and the parity information. An inaccessible parity member can be rebuilt from the accessible data members. As will be explained below, the locations of selected protection groups and reserved spare storage space can be swapped to facilitate disk load balancing.

FIG. 1 illustrates a storage array 100 with a load balancing controller 150 that relocates selected protection groups to reserved spare storage space to efficiently rebalance drive loading. The storage array is depicted in a simplified data center environment supporting two host servers 103 that run host applications, but the storage array would typically support more than two host servers. The host servers 103 include volatile memory, non-volatile storage, and one or more tangible processors. The storage array 100 includes one or more bricks 104. Each brick includes an engine 106 and one or more drive array enclosures (DAEs) 160, 162. Each engine 106 includes a pair of interconnected single-board compute nodes 112, 114 that are arranged in a failover relationship and may be referred to as "storage directors." Each compute node includes electronic hardware resources such as multi-core processors 116 and local memory 118. The processors may include multiple dies in multiple sockets with central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by other compute nodes of the storage array via direct memory access (DMA). Managed drives 101 in the DAEs 160, 162 include non-volatile storage media that may be, but is not necessarily, of a single technology type and storage capacity, where technology types may include, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. Every drive adapter 128 in the storage array can reach every DAE via the fabric 130.

Each compute node 112, 114 includes emulation modules that may run on virtual machines or guest operating systems under a hypervisor or in containers. Front-end emulation modules include a host adapter (HA) 120 and a remote adapter (RA) 121. The host adapter handles communications with the host servers 103. The remote adapter (RA) 121 handles communications with other storage systems, e.g., for remote mirroring, backup, and replication. Back-end emulation modules include a channel adapter (CA) 122 and a drive adapter (DA) 128. The channel adapter 122 handles communications with other compute nodes via an interconnecting fabric 124. The drive adapter 128 handles communications with managed drives 101 in the DAEs 160, 162. An IO services adapter 117 performs a variety of functions in support of servicing IOs from the host servers and performs storage array management tasks. The emulation modules running on the compute nodes have exclusive allocations of the local processor cores and local memory resources so different emulation modules are not free to access all local processor cores and memory resources without constraints. More specifically, each emulation module runs its own processes and threads on its own processor cores using its own memory space.

Data associated with instances of the hosted applications running on the host servers 103 is maintained on the managed drives 101. The managed drives are not discoverable by the host servers, but the storage array creates a logical storage object 140 that can be discovered and accessed by the host servers. Without limitation, the storage object may be referred to as a source device, production device, production volume, or production LUN, where the logical unit number (LUN) is a number used to identify logical storage volumes in accordance with the small computer system interface (SCSI) protocol. From the perspective of the host servers 103, the storage object 140 is a single disk drive having a set of contiguous fixed-size logical block addresses (LBAs) on which data used by the instances of the host application resides. However, the host application data is stored at non-contiguous addresses on various managed drives 101. The IO services emulations maintain metadata that maps between the logical block addresses of the storage object 140 and physical addresses on the managed drives 101 in order to process IOs from the hosts.

Figure 2:
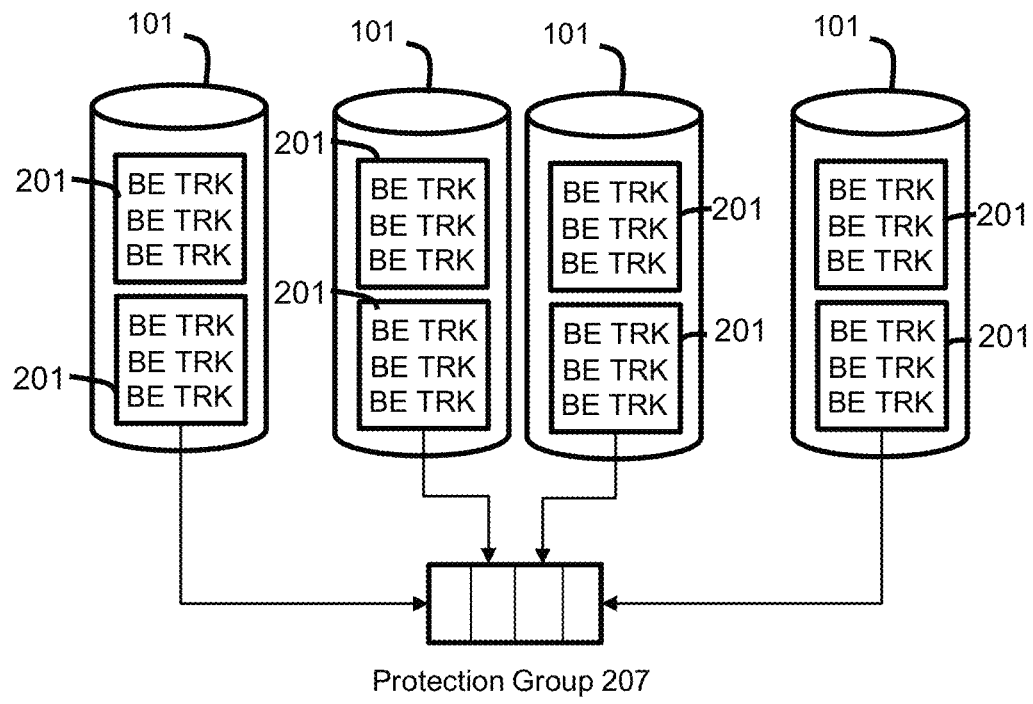
FIG. 2 illustrates layers of abstraction between the managed drives and the production volume of the storage array of FIG. 1.
Figure 2:
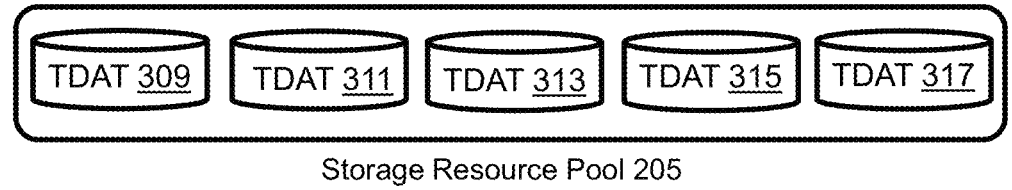
Figure 2:
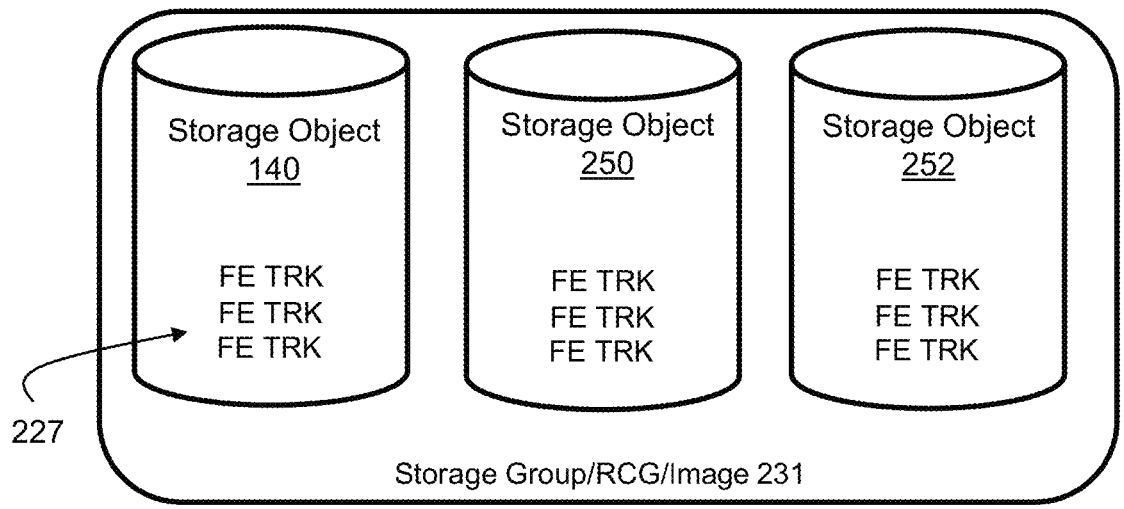

FIG. 2 illustrates layers of abstraction between the managed drives and storage objects including storage object 140. Referring to FIGS. 1 and 2, the basic allocation unit of storage capacity that is used by the compute nodes 112, 114 to access the managed drives 101 is a back-end track (BE TRK). The managed drives are organized into same-size subdivisions 201, each of which may contain multiple BE TRKs. A grouping of subdivisions from different managed drives is used to create a protection group 207. A storage resource pool 205 is a storage object that includes a collection of protection groups 207 of the same type, e.g., RAID-5 (3+1). Storage resource pools contain thinly provisioned logical data devices that are used to create the production storage objects 140, 250, 252 that can be discovered by host servers. The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory. A storage group 231 of multiple production storage objects may be created for an individual host application. The storage group may be a replication consistency group, and the data stored therein may be referred to as a host application image. Multiple instances of a single host application may use data from the same storage group, but instances of different host applications do not use data from the same storage group. The storage array may maintain a large number of production storage objects and storage groups.

Figures 3A, 3B:
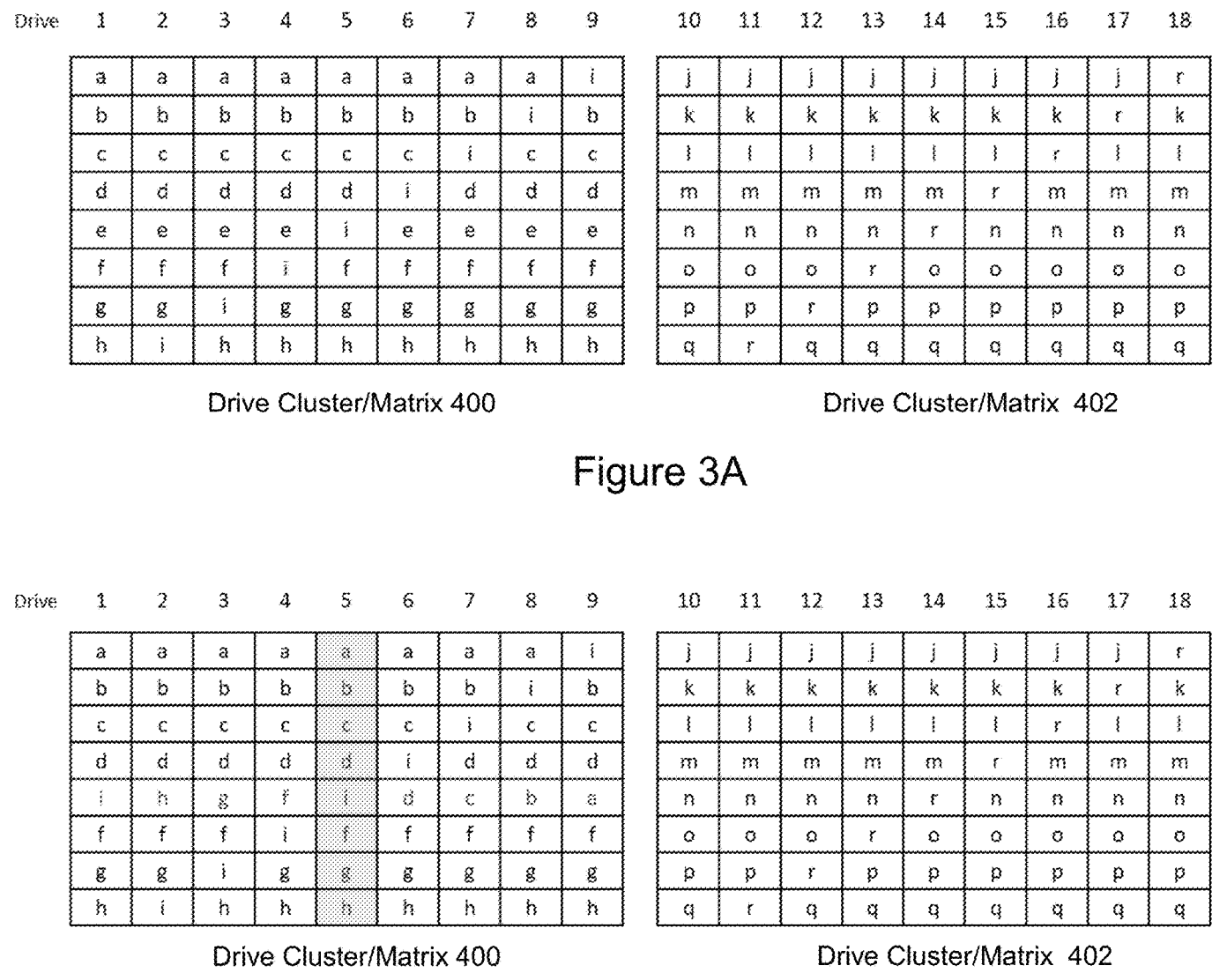

FIG. 3A illustrates distribution of subdivision groupings on managed drives. The storage space of the managed drives can be viewed as a set of matrices with the equal size subdivisions, where each column denotes an indexed disk drive, and each row denotes an indexed subdivision. More specifically, each matrix corresponds to a cluster of a multiple of (G+1) drives, each partitioned into G subdivisions, where G is the number of members per protection group, e.g., G=8 for RAID-5 (7+1) or RAID-6 (6+2). In the illustrated example, G=8 and there are 2*(G+1)=18 protection groups on two matrices corresponding to two drive clusters 400, 402, each with (G+1) drive index columns and G subdivision index rows. Groupings of subdivisions are shown with reference letters. Subdivision groupings a, b, c, d, e, f, g, h, j, k, l, m, n, o, p, q are distributed horizontally at single rows within each matrix. At least one grouping per matrix is "diagonally distributed" across multiple rows and columns. Groupings i and r are diagonally distributed on drive clusters 400 and 402, respectively, in the illustrated example. The members of a protection group are located in the same grouping and are thereby distributed over G drives. The subdivisions of at most one grouping per matrix may be reserved as spare capacity rather than being used to store members of a protection group. Any grouping in any matrix may be designated as a spare grouping. This distribution of groupings with protection group members and spares protects against any single drive failure.

FIG. 3B illustrates use of spare subdivisions to recover from a drive failure. Grouping e is the spare grouping. After drive 5 fails, protection members in groupings a, b, c, d, f, g, h, i that were stored on drive 5 are rebuilt in the free subdivisions of grouping e. Each failed protection group member is assigned to a spare subdivision on a drive where other members of the same protection group are not co-located, as required by EC/RAID protection. For any drive failure in a drive cluster that lacks spares, the spare subdivisions may be assigned to drives without restrictions. A record of the original locations (drive and subdivisions indices) is created and stored so that the original assignments of protection group members to subdivisions and locations of spare subdivisions can be restored when the failed drive is replaced.

Figure 4:
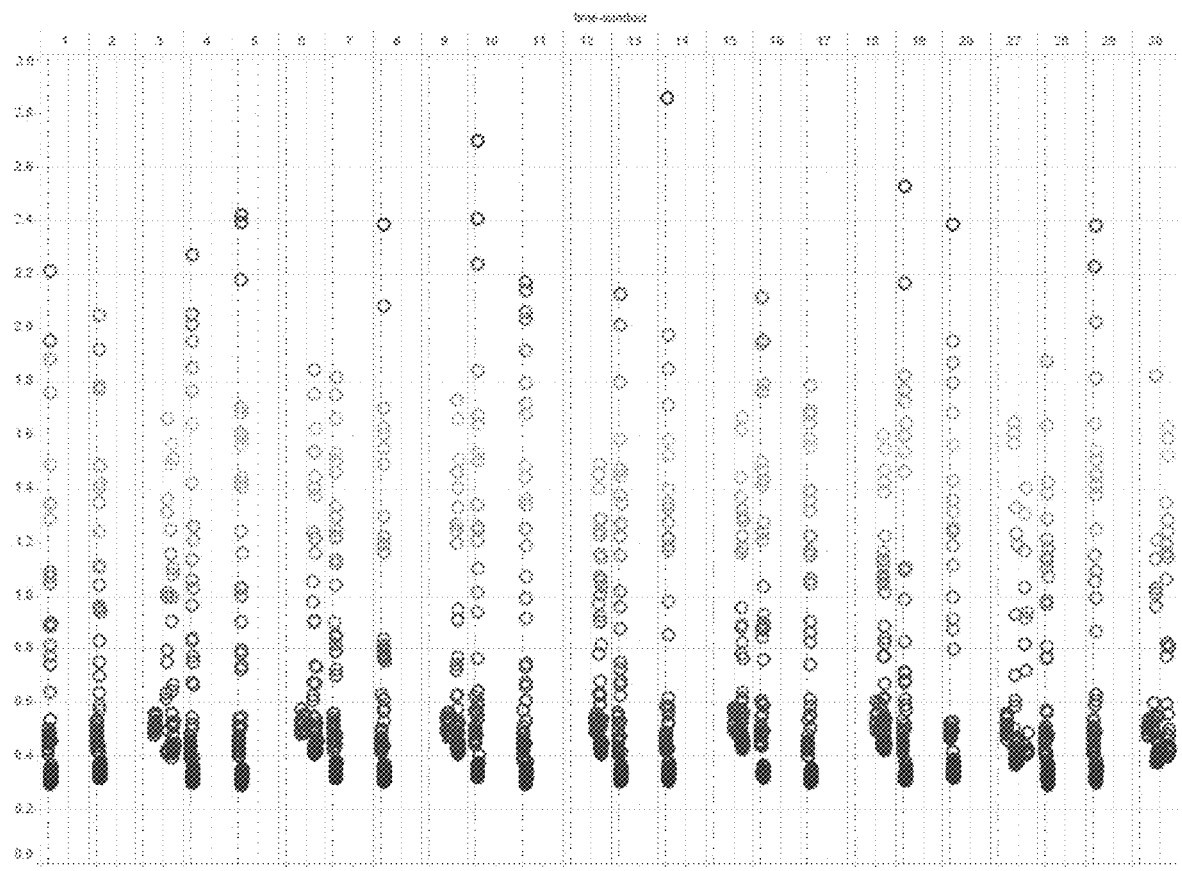
FIG. 4 illustrates identification of IO load outlier drives using LOF scores.

FIG. 4 illustrates identification of IO load outlier drives. IO loading may be balanced across protection group members within each EC/RAID group, but there may be significant variations in IO loading among different protection groups, resulting in imbalanced IO loading between the drives of a cluster. The presence of outliers is indicative of an IO loading imbalance caused by overloaded drives. The local outlier factor (LOF) algorithm described by Breunig, Kriegel, Ng, and Sander in 2000, which is generally known in the computer science arts, may be used to identify IO loading outlier drives that are overloaded. The LOF algorithm calculates local density deviation of a given data point with respect to its neighbors. Lower local density by a predetermined deviation is indicative of an outlier. LOF scores are periodically calculated for each drive of each cluster. A selected threshold LOF score, e.g., 1.5, is selected to separate outlier drives from inlier drives. In the illustrated example, individual drives of a cluster are represented by circles at points in time represented on the x-axis with LOF scores represented on the y-axis. It can be seen that the cluster includes at least one outlier drive at each time interval and is thus a candidate for rebalancing.

FIG. 5 illustrates per-subdivision and per-drive loading for protection group migration analysis. In general, loading of protection group members is balanced by data striping so individual loading of each member can be calculated from the protection group load, i.e., protection group load divided by the number of members is the approximate member load. This is advantageous because fewer computing and memory resources are required to collect and store the load statistics at the group level than at the individual member level. In the illustrated example, loading of protection group members is represented by numerical values at the partition locations in the matrices, where a greater numerical value corresponds to a greater IO load. The diagonal grouping associated with drive cluster 402 is the spare grouping so there is 0 load for each of those subdivisions. The total drive load is calculated as the sum of the loads on the subdivisions of the drive, e.g., drive 1 has a total load of 31.

FIGS. 6A and 6B illustrate selection of a protection group for migration to spares in a different cluster, swapping of the selected protection group with the spares, and rebalanced loading. Outlier drives (1, 2, 3, 7, 8, 9) that incur relatively higher loads than other drives of the cluster are identified from the LOF scores, with the aggregate load per drive ranging from 16 to 32. If the protection group with the load level of 5 per member is moved to the diagonal spares with 0 load, the drive loads in drive cluster 400 will be more balanced as indicated by reduced load range. Specifically, the range of aggregate load per drive will be reduced from [16,32] to [19,27]. The vacated subdivisions become the new spare subdivisions with 0 load.

Each protection group having members located on the outlier drives is a candidate for migration, and each candidate is evaluated to identify and select the candidate that will achieve the intended result, such as improving drive load balance by a predetermined amount, minimizing the range of IO loading, or eliminating outliers. The process does not necessarily result in selection of the protection group that will result in the lowest IO loading on the cluster. The total number of possible candidate exchanges will be proportional to the permutation function of P(N,K), where K is the number of spare groups and N is the number of data groups in the outlier drives. P(N,K)=N*(N−1)* . . . *(N−K+1) in mathematical terms. For larger drive arrays with many more drives and partitions organized as matrices, there may be multiple spare groups, providing more load balancing opportunities by exchanging multiple data groups.

Figure 7:
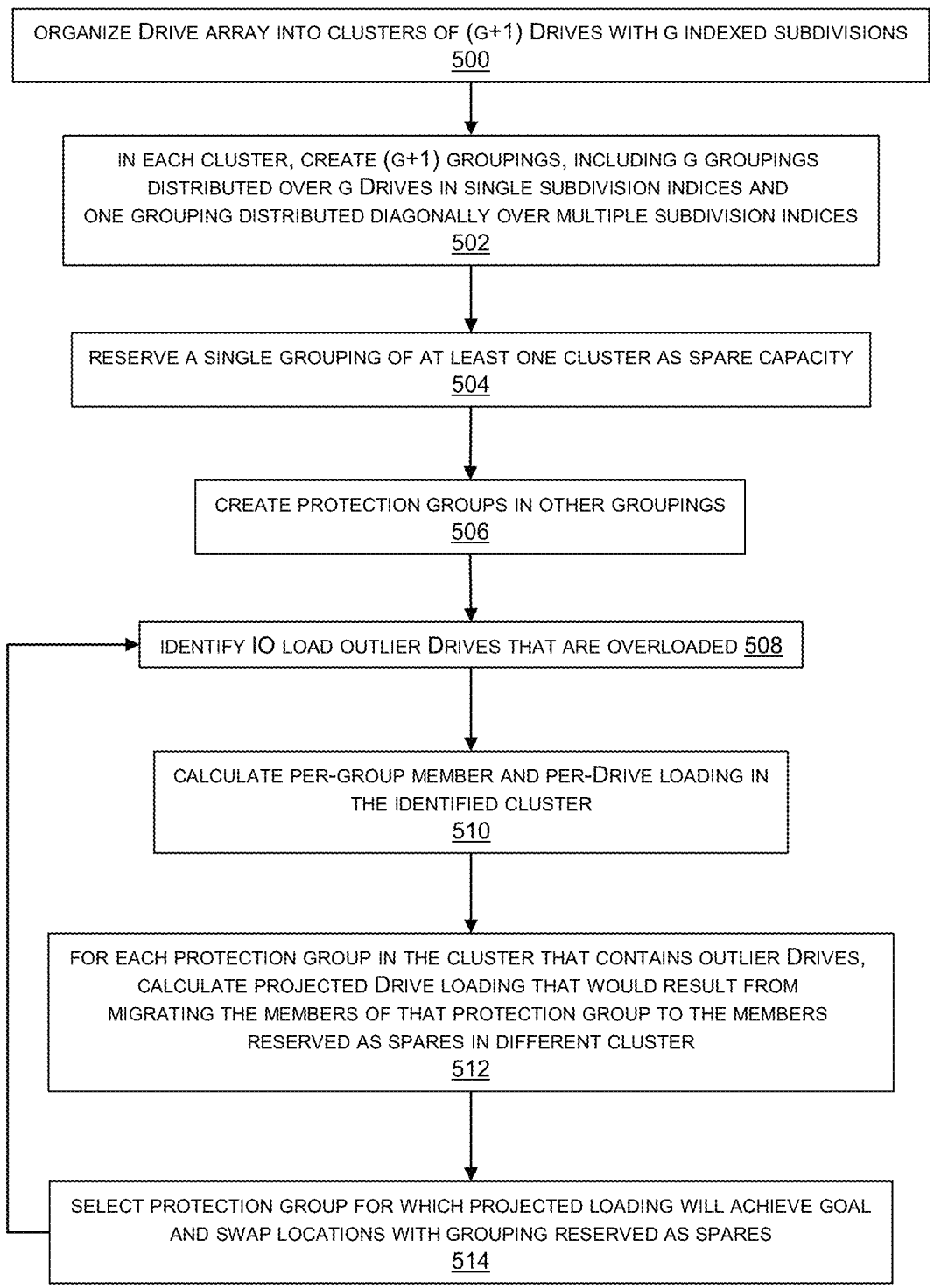
FIG. 7 illustrates a method for rebalancing drive loading by relocating protection groups.

FIG. 7 illustrates a method for rebalancing drive loading by relocating protection groups to spare groupings. Step 500 is organizing the drive array into clusters of multiples of G+1 drives with G indexed subdivisions, where G is the number of members in the protection groups that will populate the drives. In each cluster, G+1 groupings are created as indicated in step 502. G groupings are distributed over G drives in single subdivision indices. One grouping is distributed diagonally over multiple subdivision indices. A single grouping in at least one cluster is reserved as spare capacity as indicated in step 504. Protection groups are created in the groupings that have not been reserved as spares as indicated in step 506. Step 508 is identifying IO load outlier drives that are overloaded. This may be accomplished with the LOF algorithm as described above, using outlier status as an indication of IO overloading. Step 510 is calculating per-group member and per-drive loading in the identified cluster. For each protection group with a member on an outlier drive in the identified cluster, the drive loading that would result from migration of the members of the protection group to spares in a different cluster is calculated as indicated in step 512. As indicated in step 514, a protection group is selected based on the calculated projections. A wide variety of goals may be used, including, but not limited to, minimizing the range of drive loading within the cluster, eliminating some or all outliers, or simply improving load balance by a predetermined amount. If the predetermined goal cannot be achieved by migration of a protection group, then no protection group is selected. If selection of a protection group to achieve the goal was possible, then that protection group is swapped with a grouping reserved as spares on a different cluster. The process associated with steps 508-514 is performed iteratively.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
 a plurality of non-volatile drives on which Erasure Coding (EC) or Redundant Array of Independent Disks (RAID) protection groups of a selected type are implemented, each protection group having G members;
 at least one compute node configured to manage access of the non-volatile drives, the at least one compute node comprising at least one processor and non-transitory computer-readable memory; and
 a load balancing controller configured to:
  organize the drives into clusters of multiples of G+1 drives with G same-size indexed subdivisions able to be represented as a set of matrices having rows and columns that represent subdivision indices and drive indices;
  in each of the clusters, create G+1 groupings, including G groupings distributed over G drives in single subdivision indices and one grouping distributed diagonally over multiple subdivision indices as represented in the matrices;
  reserve a single grouping in at least one of the clusters as a spare grouping of spare capacity; and
  locate ones of the protection groups in ones of the groupings that are not the spare grouping.

2. The apparatus of claim 1 further comprising the load balancing controller configured to iteratively select one of the protection groups and relocate the selected protection group to the spare grouping to rebalance drive loading.

3. The apparatus of claim 2 further comprising the load balancing controller configured to analyze each of the clusters to identify input-output (IO) load outlier drives that are overloaded.

4. The apparatus of claim 3 further comprising the load balancing controller configured to calculate IO loading per drive and per grouping in one of the clusters for which IO load outlier drives have been identified.

5. The apparatus of claim 4 further comprising the load balancing controller configured to calculate, for each protection group on the cluster for which IO load outlier drives have been identified, per drive IO loading that would result from swapping location of the members of that protection group with locations of the spare grouping.

6. The apparatus of claim 5 further comprising the load balancing controller configured to select one of the protection groups based on the calculated per drive IO loading that would result from swapping location of the members of that protection group with locations of the spare grouping and relocate the members of the selected protection group to the locations of spare grouping and create a spare grouping in vacated subdivisions.

7. The apparatus of claim 6 further comprising the load balancing controller configured to select one of the protection groups based on the calculated per drive IO loading that would result from swapping location of the members of that protection group with locations of the spare grouping and one or more of: minimizing drive IO loading range within the cluster; elimination of some or all outliers; and improving load balance by a predetermined amount.

8. A method comprising:
 organizing drives of a drive array on which Erasure Coding (EC) or Redundant Array of Independent Disks (RAID) protection groups of a selected type are implemented into clusters of multiples of G+1 drives with G same-size indexed subdivisions, the drive array able to be represented as a set of matrices having rows and columns that represent subdivision indices and drive indices;
 in each of the clusters, creating G+1 groupings, including distributing G groupings distributed over G drives in single subdivision indices and distributing one grouping diagonally over multiple subdivision indices;
 reserving a single grouping in at least one of the clusters as a spare grouping of spare capacity; and
 locating ones of the protection groups in ones of the groupings that are not the spare grouping.

9. The method of claim 8 further comprising iteratively selecting one of the protection groups and relocating the selected protection group to the spare grouping to rebalance drive loading.

10. The method of claim 9 further comprising analyzing each of the clusters to identify input-output (IO) load outlier drives that are overloaded.

11. The method of claim 10 further comprising calculating IO loading per drive and per grouping in one of the clusters for which IO load outlier drives have been identified.

12. The method of claim 11 further comprising calculating, for each protection group on the cluster for which IO load outlier drives have been identified, per drive IO loading that would result from swapping location of the members of that protection group with locations of the spare grouping.

13. The method of claim 12 further comprising selecting one of the protection groups based on the calculated per drive IO loading that would result from swapping location of the members of that protection group with locations of the spare grouping and relocating the members of the selected protection group to the locations of spare grouping and creating a spare grouping in vacated subdivisions.

14. The method of claim 13 further comprising selecting one of the protection groups based on the calculated per drive IO loading that would result from swapping location of the members of that protection group with locations of the spare grouping and one or more of: minimizing drive IO loading range within the cluster; eliminating of some or all outliers; and improving load balance by a predetermined amount.

15. A non-transitory computer-readable storage medium with instructions that when executed by a computer perform a method comprising:
 organizing drives of a drive array on which Erasure Coding (EC) or Redundant Array of Independent Disks (RAID) protection groups of a selected type are implemented into clusters of multiples of G+1 drives with G same-size indexed subdivisions, the drive array able to be represented as a set of matrices having rows and columns that represent subdivision indices and drive indices;

in each of the clusters, creating G+1 groupings, including distributing G groupings distributed over G drives in single subdivision indices and distributing one grouping diagonally over multiple subdivision indices;

reserving a single grouping in at least one of the clusters as a spare grouping of spare capacity; and locating ones of the protection groups in ones of the groupings that are not the spare grouping.

16. The non-transitory computer-readable storage medium of claim 15 in which the method further comprises iteratively selecting one of the protection groups and relocating the selected protection group to the spare grouping to rebalance drive loading.

17. The non-transitory computer-readable storage medium of claim 16 in which the method further comprises analyzing each of the clusters to identify input-output (IO) load outlier drives that are overloaded.

18. The non-transitory computer-readable storage medium of claim 17 in which the method further comprises calculating IO loading per drive and per grouping in one of the clusters for which IO load outlier drives have been identified.

19. The non-transitory computer-readable storage medium of claim 18 in which the method further comprises calculating, for each protection group on the cluster for which IO load outlier drives have been identified, per drive IO loading that would result from swapping location of the members of that protection group with locations of the spare grouping.

20. The non-transitory computer-readable storage medium of claim 19 in which the method further comprises selecting one of the protection groups based on the calculated per drive IO loading that would result from swapping location of the members of that protection group with locations of the spare grouping and relocating the members of the selected protection group to the locations of spare grouping and creating a spare grouping in vacated subdivisions.

* * * * *